E. OMBERG.
SIFTER.
APPLICATION FILED AUG. 29, 1907.
983,398.
Patented Feb. 7, 1911.
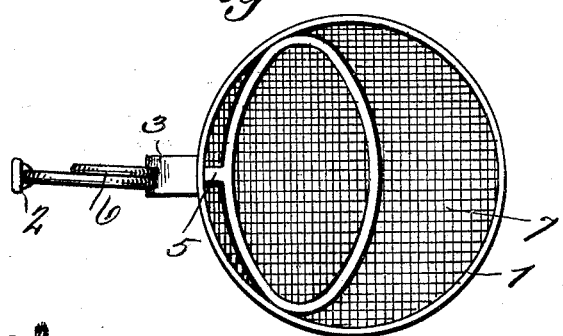
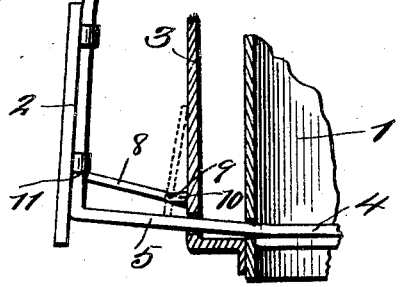
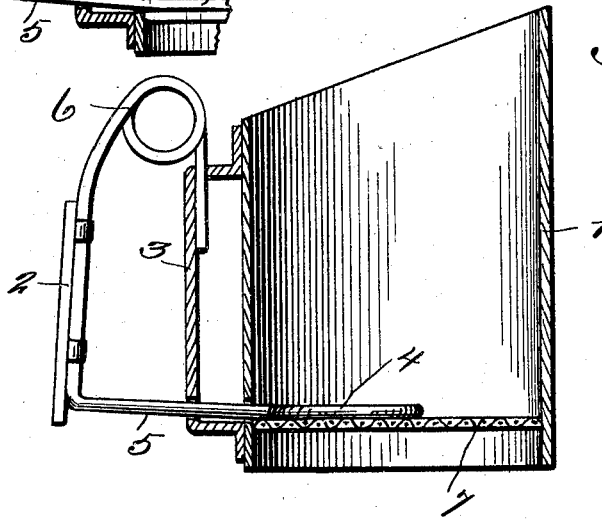
Witnesses
Inventor
E. Omberg
By D. Swift
Attorneys

UNITED STATES PATENT OFFICE.

EDWARD OMBERG, OF HAWLEY, MINNESOTA.

SIFTER.

983,398. Specification of Letters Patent. Patented Feb. 7, 1911.

Application filed August 29, 1907. Serial No. 390,666.

*To all whom it may concern:*

Be it known that I, EDWARD OMBERG, a citizen of the United States, residing at Hawley, in the county of Clay and State of Minnesota, have invented a new and useful Sifter; and I do hereby declare the following to be a full, clear, and exact description of the invention, such as will enable others skilled in the art to which it appertains to make and use the same.

The invention relates to improvements in sifters and has for its object to provide a simple, inexpensive and durable device of the character, having a scoop and an improved agitator for stirring or agitating the flour.

With these and other objects in view, the invention consists in the novel construction and arrangement of parts hereinafter described and claimed.

In the drawings forming part of this specification, and in which, like numerals of reference indicate similar parts, in the several views Figure 1 is a top plan view of a sifter constructed in accordance with this invention. Fig. 2 is a vertical sectional view. Fig. 3 is a vertical sectional view of a modified form.

Referring to the drawings, 1 designates a scoop which may be made of tin, zinc or any other suitable material having a handle 2, which is connected with a suitable bracket 3, mounted on the scoop. On the interior of the scoop is arranged, the agitator 4, which is an ordinary loop but any other form of agitator may be used. The agitator is connected with a rod 5, which connects with the handle 2, as will be clearly understood. The device is provided with a coil spring 6, which aids in actuating the agitator 4 which causes the flour to pass through the sifter proper 7. The bracket 3 is provided with a projection 10 to which a locking member 8 is pivotally connected, as at 9.

When it is desired to use the device as a scoop the member 8 is pressed against the handle 2 as at 11, which holds the device in a rigid state.

Having thus described the invention, what is claimed is:—

1. A device as specified, comprising a receptacle having a sieve equipped bottom and provided with a handle, comprising a stationary portion and a spring tensioned movable portion, said spring having an agitator arm integral therewith which extends laterally into said receptacle and is provided with an elliptical shaped looped agitator, said stationary portion of the handle having pivoted thereto a retaining latch, adapted to engage transversely between said spring tensioned movable portion of the handle and the stationary portion when the device is not in use.

2. The combination of a receptacle including a sieve equipped bottom, and provided with a bracket extending the height of the receptacle, a member including a coil at its upper portion, and provided at its lower portion with a right angled part terminating into a looped formed agitator to coöperate with the sieve, said right angled part extending through the lower part of the bracket and the receptacle, said member constituting a handle and including a strap, said bracket having a projection adjacent the point where the right angled part extends through the bracket, and a locking bar pivoted to the projection and adapted to be thrown downwardly to engage under the strap to hold the member constituting the handle rigid with regard to the receptacle, said looped agitator being brought closely in contact with the receptacle when the member is locked.

In testimony whereof I have hereunto affixed my signature in presence of two witnesses.

EDWARD OMBERG.

Witnesses:
L. L. HAGEN,
CHARLES HAGEN.